United States Patent
Oh et al.

(10) Patent No.: US 9,836,157 B2
(45) Date of Patent: Dec. 5, 2017

(54) ACOUSTIC USER INTERFACE APPARATUS AND METHOD FOR RECOGNIZING TOUCH AND RUBBING

(71) Applicant: HYUNDAI MOTOR COMPANY, Seoul (KR)

(72) Inventors: Kwang Myung Oh, Daejeon (KR); Sung Jin Sah, Suwon-si (KR); Sung Min Park, Seoul (KR); Hui Sung Lee, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 192 days.

(21) Appl. No.: 14/558,481

(22) Filed: Dec. 2, 2014

(65) Prior Publication Data

US 2016/0085380 A1    Mar. 24, 2016

(30) Foreign Application Priority Data

Sep. 22, 2014  (KR) .................. 10-2014-0125906

(51) Int. Cl.
*G06F 3/043*   (2006.01)
*G06F 3/041*   (2006.01)
(Continued)

(52) U.S. Cl.
CPC .......... *G06F 3/0416* (2013.01); *G06F 3/0202* (2013.01); *G06F 3/043* (2013.01);
(Continued)

(58) Field of Classification Search
CPC ................. G06F 3/0433; G06F 3/0416; G06F 1/16–1/1698; G06F 3/0436;
(Continued)

(56) References Cited

U.S. PATENT DOCUMENTS 4,376,469 A * 3/1983 Longrod .................... B41J 5/08
                                                     178/17 C
4,384,633 A * 5/1983 Hoyer-Ellefsen .......... B41J 5/08
                                                     178/17 C
(Continued)

FOREIGN PATENT DOCUMENTS

JP   S58-132834   *  8/1983  ............... G06F 3/16
JP   2010-266906 A    11/2010
(Continued)

OTHER PUBLICATIONS

Machine translation, Terai, JP2012064095, translation date: Mar. 27, 2017, Espacenet, all pages.*

(Continued)

*Primary Examiner* — Victoria K Hall
(74) *Attorney, Agent, or Firm* — McDermott Will & Emery LLP (57) ABSTRACT

An acoustic user interface apparatus and method can detect physical touch contacting a sensing surface and improve the accuracy of direction recognition of a touch or rubbing without any complicated algorithm. The user interface apparatus and method use one microphone to detect and analyze sound waves which are generated by collisions between bumps formed in a top plate or bottom plate of the interface apparatus and the opposing bottom plate or top plate when a user is touching or rubbing the sensing surface.

14 Claims, 7 Drawing Sheets

(51) Int. Cl.
*G06F 3/02* (2006.01)
*G06F 3/0488* (2013.01)

(52) U.S. Cl.
CPC ........ *G06F 3/04886* (2013.01); *G06F 3/0433* (2013.01); *G06F 3/0436* (2013.01); *G06F 2203/04809* (2013.01); *H01H 2233/038* (2013.01); *H01H 2233/048* (2013.01); *H01H 2235/00* (2013.01); *H01H 2237/00* (2013.01)

(58) Field of Classification Search
CPC ........ H03K 2217/960755; H03K 2217/96003; H03K 2217/96007; H03K 2217/96011; H01H 2233/028; H01H 2233/038; H01H 2233/048; H01H 2233/068; H01H 2233/088; H01H 2233/108; H01H 2235/01; H01H 2235/018; H01H 2235/02; H01H 2237/00; H01H 2237/002; H01H 2237/004; H01H 2237/008
USPC ............ 345/177; 400/472, 477, 491.2, 491.3
See application file for complete search history.

(56) References Cited

U.S. PATENT DOCUMENTS

| | | | | |
|---|---|---|---|---|
| 4,599,607 A * | 7/1986 | Hill | ........................ | G06F 3/043 178/17 C |
| 5,456,541 A * | 10/1995 | Ching-Shui | ................ | B41J 5/12 200/345 |
| 5,579,002 A * | 11/1996 | Iggulden | .............. | H03K 17/967 200/5 A |
| 5,951,178 A * | 9/1999 | Lim | ...................... | G06F 3/0221 361/679.13 |
| 6,236,339 B1 * | 5/2001 | Kamizono | ............ | G06F 3/0231 178/17 C |
| 8,855,855 B2 * | 10/2014 | Lee | ........................ | B60K 37/06 327/517 |
| 9,454,268 B2 * | 9/2016 | Badaye | ................. | G06F 3/0416 |
| 9,459,160 B2 * | 10/2016 | Shaw | ....................... | G01L 1/146 |
| 9,477,363 B2 * | 10/2016 | Lien | ......................... | G06F 3/044 |
| 9,501,177 B2 * | 11/2016 | Oh | .......................... | G06F 3/043 |
| 9,612,659 B2 * | 4/2017 | Ciesla | .................. | G06F 3/04886 |
| 2011/0284355 A1 * | 11/2011 | Yang | ..................... | H01H 13/702 200/5 A |
| 2011/0316798 A1 | 12/2011 | Jackson et al. | | |
| 2012/0000759 A1 * | 1/2012 | Chen | ..................... | H01H 13/703 200/5 A |
| 2012/0132509 A1 * | 5/2012 | Sugawara | .......... | G03G 15/5016 200/5 A |
| 2014/0240296 A1 * | 8/2014 | Kim | ..................... | G06F 3/0433 345/177 |
| 2015/0001059 A1 * | 1/2015 | Lin | ........................ | H01H 13/02 200/5 A |
| 2016/0011663 A1 * | 1/2016 | Starner | .................... | G06F 1/163 340/407.2 |
| 2016/0155592 A1 * | 6/2016 | Ito | .......................... | H01H 50/36 335/187 |
| 2016/0239047 A1 * | 8/2016 | Weber | ................... | G06F 1/1656 |

FOREIGN PATENT DOCUMENTS

| | | |
|---|---|---|
| JP | 2012-064095 A | 3/2012 |
| KR | 10-2005-0006068 A | 1/2005 |
| KR | 10-2005-0063777 A | 6/2005 |
| KR | 10-0803400 B1 | 2/2008 |
| KR | 10-2008-0050169 A | 6/2008 |
| KR | 10-2008-0050352 A | 6/2008 |
| KR | 10-2012-0030202 A | 3/2012 |
| KR | 10-2012-0031564 A | 4/2012 |
| KR | 10-2014-0005764 A | 1/2014 |
| KR | 10-1371749 B1 | 3/2014 |
| WO | 2008/020699 A1 | 2/2008 |

OTHER PUBLICATIONS

Machine translation (partial), Machida, JPS58132834, translation date: Mar. 27, 2017, Espacenet, all pages.*
Machine translation, Choi, KR 1020120030202, translation date: Mar. 27, 2017, Espacenet, all pages.*
Machine translation, Kim, KR 1020080050169, translation date: Mar. 27, 2017, Espacenet, all pages.*

* cited by examiner

ACOUSTIC USER INTERFACE APPARATUS AND METHOD FOR RECOGNIZING TOUCH AND RUBBING

CROSS-REFERENCE TO RELATED APPLICATION

This application is based on and claims priority from Korean Patent Application No. 10-2014-0125906, filed on Sep. 22, 2014 in the Korean Intellectual Property Office, the disclosure of which is incorporated herein in its entirety by reference.

FIELD OF THE INVENTION

The present disclosure relates to an Acoustic User Interface (AUI) apparatus and method, and more particularly, an AUI apparatus and method for providing a sense of physical touch and improving the accuracy of recognition of touch and rubbing direction.

BACKGROUND

In a capacitive or pressure sensor based touch screen, the recognition of a touch or rubbing is easily performed, but, in an acoustic based touch screen which is recently studied, the accuracy of the touch or rubbing recognition is limited.

Although a more complicated design such as the surface roughness, the pad structure, etc. is required, it is difficult to implement the AUI. For example, while the surface roughness of the AUI apparatus needs to vary so as to distinguish the sound wave depending on the direction of rubbing when rubbing, it is very difficult to implement the surface roughness at which generated sound waves are different, since the difference of the sound waves is very small. Also, in a case where the sense of touch is recognized to be dependent on the change of the surface illumination intensity, etc. by a touch or rubbing, it still has structural limitations in recognizing the direction of a touch or rubbing based on sound wave.

SUMMARY OF THE INVENTION

Thus, in order to solve the above problems, the object of the present invention is to provide an acoustic user interface apparatus and method capable of providing a sense of physical touch depending on the press or restoration and improving the accuracy of direction recognition of a touch or rubbing without any complicated algorithm by detecting and analyzing the sound wave, which is generated by the collision of a bump formed in a top plate or bottom plate when touching or rubbing, using one microphone.

An acoustic user interface apparatus comprises a first substrate; a second substrate including touch cells which are pressable by a touch and restorable by an elastic force, and are arranged in two dimensions; and a bump which is formed on each of the touch cells to be apart from the first substrate by a predetermined distance, respectively, or is formed on each of corresponding positions of the first substrate to be apart from the touch cells by a predetermined distance, respectively.

Any one of a top plate and a bottom plate may be the first substrate, the other one of the top plate and the bottom plate may be the second substrate.

The apparatus may further comprise a sound wave detector configured to generate an electric signal for a sound wave generated from a portion of which the bump is collided by touch.

The apparatus may further comprise a processor configured to convert a signal of the sound wave detector to a digital signal and generate position data corresponding to a position of the touched bump.

So as to generate different sound waves according to a position in a portion of which the bump is collided by the touch, area, a material, a density of impact surface of the bump, or a size or shape of an empty space inside the bump may be differently formed according to the position.

The second substrate includes a structure type including an upper surface made of a flexible material and the touch cells attached to a lower side of the upper surface.

The second substrate may include a structure type connected by an elastic connector through a side of the touch cells.

Each elastic body may be included between the each bump formed on the first substrate and an upper surface of the second substrate.

Each cover for covering the each elastic body may be included in the upper surface of the second substrate.

An acoustic user interface method for generating a position signal by distinguishing a sound wave of a touch portion according to a position according to another aspect of the present inventive concept comprises a step of generating a sound wave from a portion collided with a first substrate when touching a second substrate including touch cells which are pressable by a touch and restorable by an elastic force, and are arranged in two dimensions. A bump is formed on each of the touch cells and is spaced apart from the first substrate by a predetermined distance, respectively, or is formed on each of corresponding positions of the first substrate and is spaced apart from the touch cells by a predetermined distance, respectively. When the bump is collided with the first substrate, the sound wave is generated.

Any one of a top plate and a bottom plate may be the first substrate, the other one of the top plate and the bottom plate may be the second substrate.

The method may further comprise a step of generating an electric signal for a sound wave generated from a portion which the bump is collided by touch by using a sound wave detector.

The method may further comprise a step of converting a signal of the sound wave detector to a digital signal and generating position data corresponding to a position of the touched bump by using a processor.

So as to generate different sound waves according to a position in a portion of which the bump is collided by touch, area, a material, density of impact surface of the bump, or size or shape of empty space inside the bump may be differently formed according to the position.

The second substrate includes a structure type including an upper surface made of a flexible material and the touch cells attached to a lower of the upper surface.

The second substrate may include a structure type connected by an elastic connector through a side of the touch cells.

Each elastic body may be included between the each bump formed on the first substrate and an upper surface of the second substrate.

Each cover for covering the each elastic body may be included in the upper surface of the second substrate.

According to an acoustic user interface apparatus and method of the present inventive concept, it is possible to secure the more sure feature point on the spectrum in a touch recognition technology using sound waves by generating the basically different sound waves for each position and thus, a robust position recognition technology can be implemented. Also, with only one microphone, it is possible to recognize rubbing and distinguish the direction as well as the position of touch, and because of utilizing the sound waves which are basically, differently generated, the algorithm can be simplified and its software and hardware can be easily produced.

Also, according to an acoustic user interface apparatus and method of the present inventive concept, a little physical variation in a pad on touching provides a physical sense of touch, and thus gives an immediate feedback which input information is entered to a user, thus the accuracy of the data input may be improved. Also, as compared with the conventional touch or rubbing recognition by the change of the surface illumination intensity (roughness) or thickness, or any other combination method, the rubbing recognition according to the present inventive concept has a high resolution for distinguishing the direction because the sound wave signal is great and the sound wave difference depending on the direction of rubbing is clear.

And, according to an acoustic user interface apparatus and method of the present inventive concept, through the intensity of the collision sound wave generated by a touch, also, the user may easily recognize the touch intensity. Also, in the conventional acoustic user interface technology, since a different sound is generated depending on the humidity of the user's hand when rubbing a pad, compensation for the difference in sound resulting from the humidity is required. In contrast, in the present inventive concept, the compensation for the humidity of the finger for an individual user is not needed. Also, even though a user performs a touch while wearing a glove or using a tool such as a pencil, the sound wave when touching can be recognized without any compensation for the input means.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present inventive concept will be described in detail with reference to the drawings. At this time, in each of the drawings, the same components are denoted by the same reference symbols, if possible. Further, detailed descriptions for the previously known features and/or configurations are omitted. In the description below, parts required to understand operations in accordance with various embodiments will be explained in priority, and the descriptions for elements which may obscure the gist of the descriptions are omitted. Additionally, some of the elements shown schematically in the figures have sizes that are exaggerated while other elements are omitted. The size of an element in the figures does not necessarily reflect an actual size of the element, so that sizes shown in the figures are not intended to limit the content that is specified here by the relative size and spacing of the elements drawn in the figure.

Figure 1:
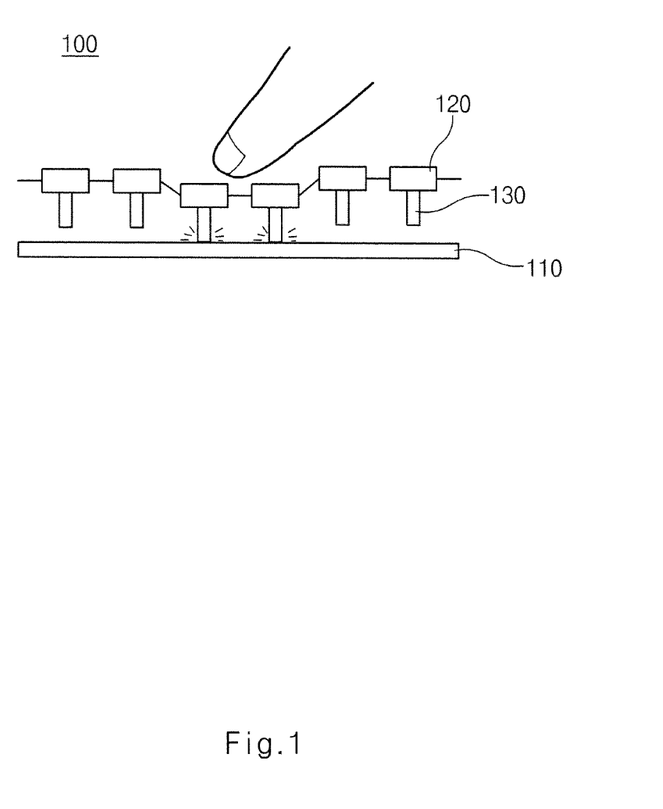
FIG. 1 is a diagram illustrating an acoustic user interface apparatus according to an embodiment of the present inventive concept.

FIG. 1 is a diagram illustrating an acoustic user interface apparatus according to an embodiment of the present inventive concept.

Figure 6:
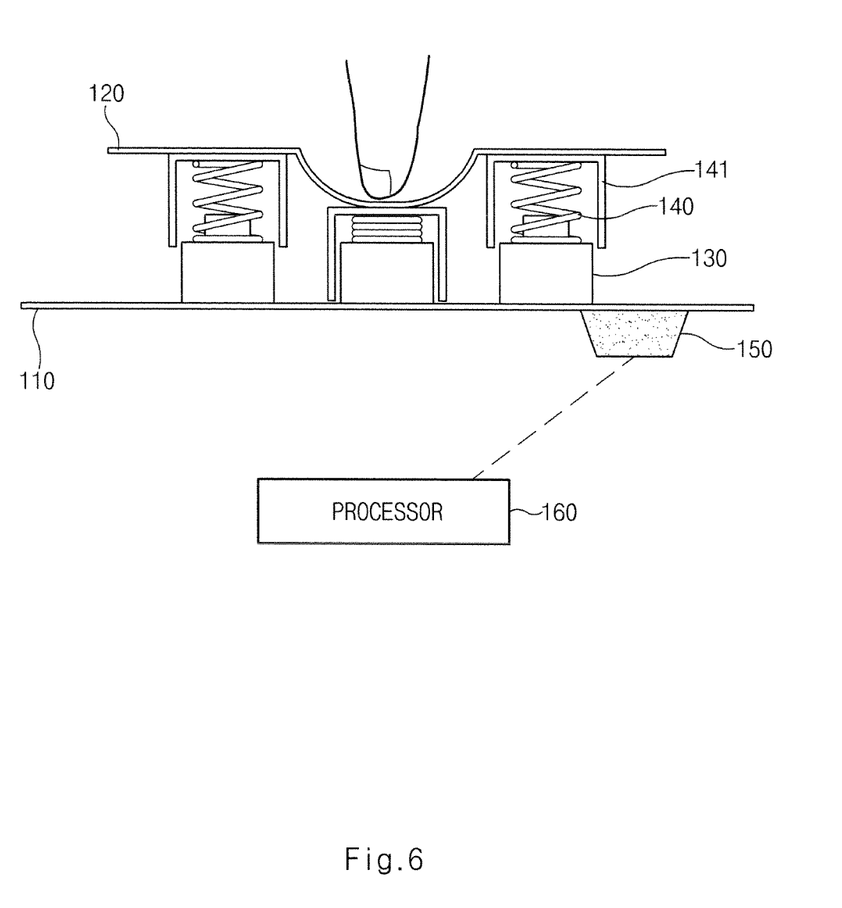
FIG. 6 is a diagram illustrating the sound wave generation and the touch recognition in an acoustic user interface apparatus according to another embodiment of the present inventive concept.

Referring to FIG. 1, an acoustic user interface apparatus 100 according to an embodiment of the present inventive concept includes a first substrate 110, a second substrate 120 having touch cells regularly arranged in two dimensions and a bump 130 formed on each of the touch cells to be apart from the first substrate 110 by a predetermined distance or formed on each of the corresponding position of the first substrate 110 to be apart from the touch cells by a predetermined distance. FIG. 1 is an example in which the bump 130 is configured on the second substrate 120, and the bump 130 may be configured on the first substrate 110 as shown in FIG. 6. The first substrate 110 and the second substrate 120 opposed may be a top plate and a bottom plate, respectively. But, it is not limited thereto. That is, any one of the top plate and the bottom plate may be the first substrate 110, and the other one of the opposing top plate and bottom plate may be the second substrate 120.

If the second substrate 120 is pressed or rubbed by using a finger or a pen type assisting tool, the bump 130 impacts the first substrate 110 or the second substrate 120 touch cells. Each bump 130 generates the different sound waves for notifying the different positions, because bump 130 is formed to have a different area, material, density of impact surface, or size or shape of empty space inside the bump, etc., although each bump 130 has the same height. The bumps 130 can be implemented by combining the area, material, density of the impact surface, or the size or shape of the empty space inside the bump, etc.

The acoustic user interface apparatus 100 forms the touch cells on the second substrate 120 with a flexible material or makes the second substrate 120 so as to have touch cells that are connected by an elastic connector. A sense of physical touch can be provided depending on the press of the touched cells and the restoration when removing the touch, and by detecting and analyzing the sound wave generated by the collision of the bump formed on the first substrate 110 or the second substrate 120 using one microphone when touching or rubbing. Thus, the accuracy of the direction recognition of touch or rubbing can be improved without any complicated algorithm.

Figure 2A:
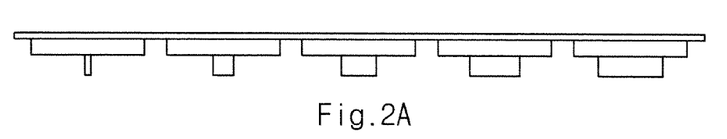
FIG. 2A and FIG. 2B are diagrams illustrating bump structures of the present inventive concept.
Figure 2B:
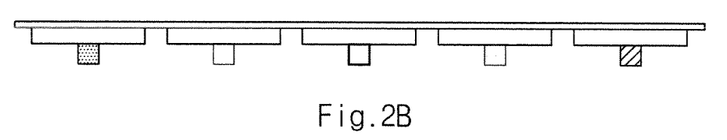

FIG. 2 is a diagram illustrating a structure of a bump of the present inventive concept. In order to generate the different sound waves in each bump 130 when the bump 130 collides, density of the impact surface, or the size or shape of the empty space inside the bump may be differently formed although each bump 130 may have the same height, the area, material. That is, as shown in FIG. 2A, by forming the area of the bottom impact surface differently depending on the position, the different sound waves may be generated when colliding. Also, as shown in (FIG. 2B, although the shape (volume, bottom surface area, etc.) of each bump 130 is the same, by forming each bump 130 to have a different material or density or a different size or shape of an empty space inside the bump depending on the position of the bump 130, the different sound waves may be generated when colliding.

Figure 3:
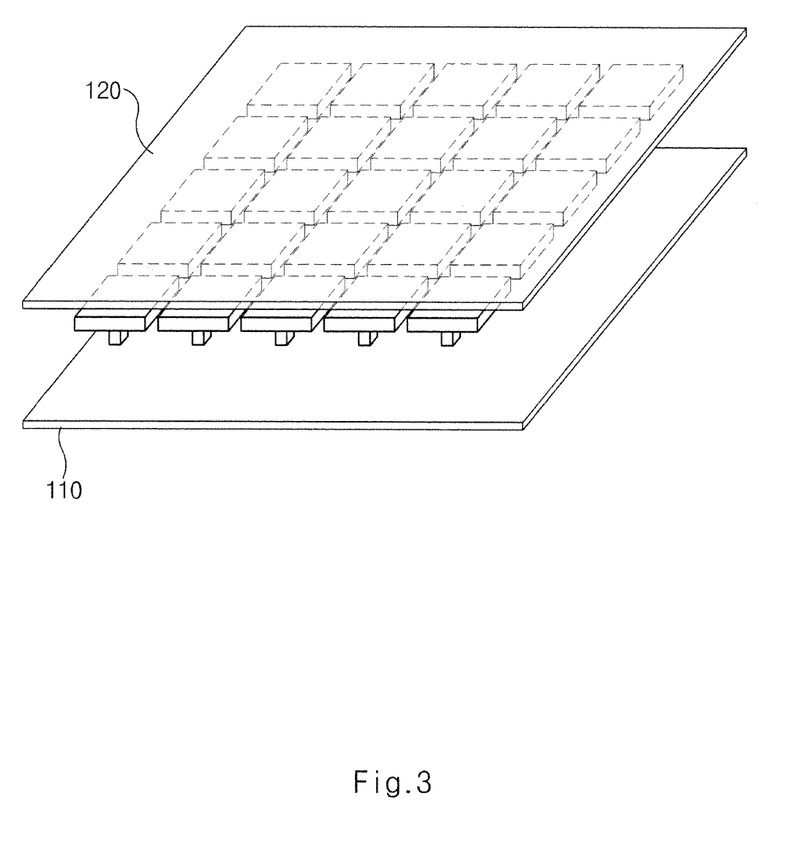
FIG. 3 is diagram illustrates an example of touch cells of the present inventive concept.

FIG. 3 is diagram illustrating an example of touch cells of the present inventive concept.

As shown in FIG. 3, the top plate of the second substrate 120 where user's touch is applied is made of a flexible material such as a polymer or a silicon pad, the touch cells are attached to the bottom, and each bump 130 is spaced apart from the first substrate 110 by a predetermined distance (for example, in the order of mm). In the drawing, although each bump 130 is formed on the touch cells, each bump 130 may be also formed on the opposing position of the first substrate 110. When locally pressing or rubbing the second substrate 120 by using a finger or an assisting tool of a pen type, the touched cells can be restored to the original position by the elastic force of the flexible material, and thus, while a user feels a sense of physical touch, the user can accurately input data.

Figure 4:
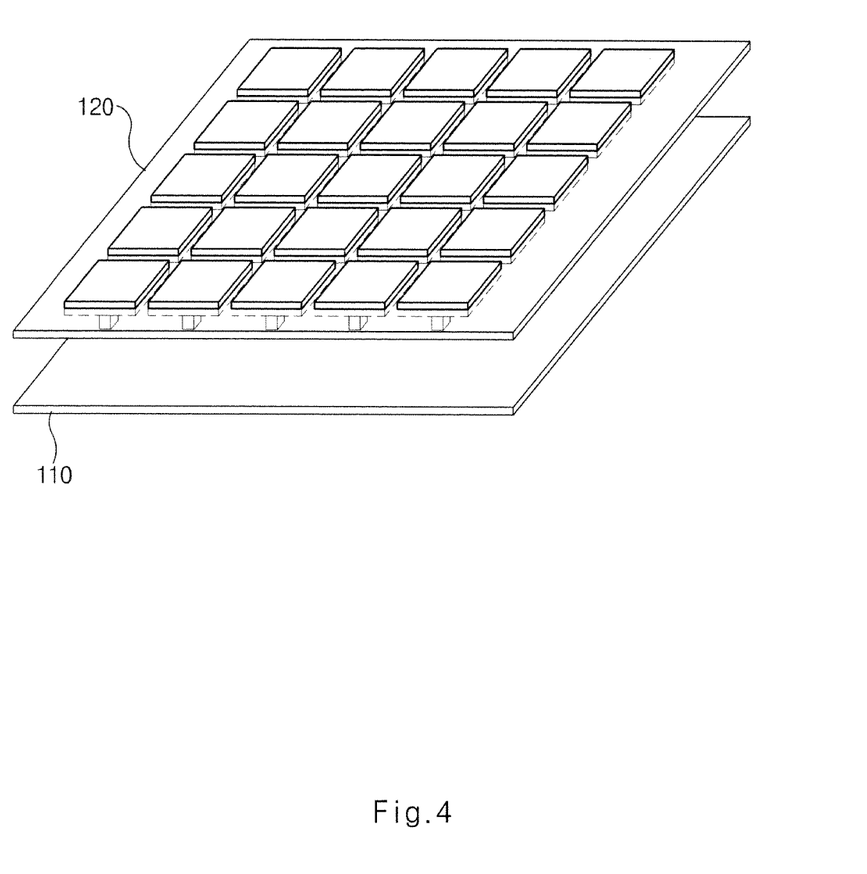
FIG. 4 is diagram illustrating another example of touch cells of the present inventive concept.

FIG. 4 is diagram illustrating another example of touch cells of the present inventive concept. As shown in FIG. 4, the second substrate 120 can be made as the type which the touch cells are connected by the elastic connector. That is, by connecting each touch cell having no bump 130 (the case which the bump is formed on the first substrate) or having a bump 130 with a flexible material such as a polymer or a silicon pad through the side, a part of each touch cell may peak over the flexible material of the two-dimensional hole arrangement. At this time, when locally pressing or rubbing the touch cells of the second substrate 120 by using a finger or an assisting tool of a pen type, the touched cell(s) can be restored to the original position by the elastic force of the flexible material. Thus, a user can feel a sense of physical touch, and accurately input data.

Figure 5:
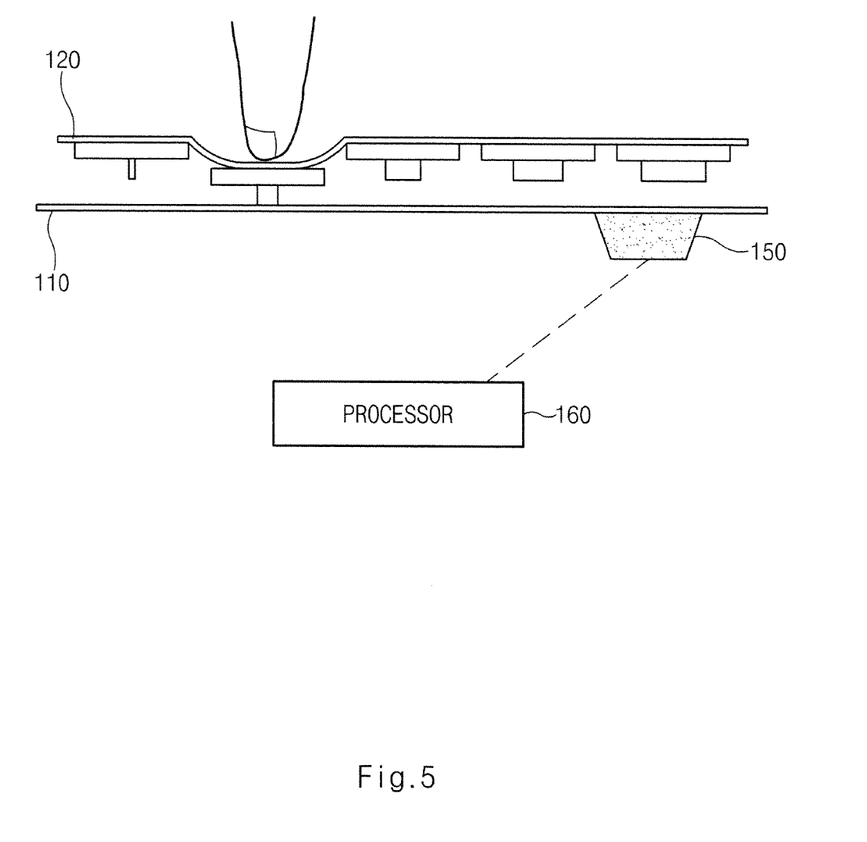
FIG. 5 is a diagram illustrating the sound wave generation and the touch recognition in an acoustic user interface apparatus according to an embodiment of the present inventive concept.

FIG. 5 is a diagram illustrating the sound wave generation and the touch recognition in an acoustic user interface apparatus according to an embodiment of the present inventive concept. The acoustic user interface apparatus 100 includes a microphone 150 as an acoustic detecting means properly installed on the first substrate 110.

In addition to the second substrate 120 where the touch cells and the bump 130 are formed at the bottom of the top plate of the flexible material, the second substrate 120 can be made as the type where the touch cells are connected by the elastic connector as shown in FIG. 4. Also, as shown in FIG. 6, in order to reinforce the stability, the bumps 130 are regularly formed on the first substrate 110 in two dimensions, an elastic body such as a spring, etc. is provided between the second substrate 120 and each bump 130. The bump 130 is ordinarily spaced apart from the second substrate 120 and, when the second substrate 120 is touched, the second substrate 120 collides with the bump 130, thus the sound wave may be generated. At this time, in the top plate of the second substrate 120, each cover 141 for covering whole or in part of the elastic body 140 can be formed as a touch cell.

As shown in FIG. 5 or FIG. 6, the microphone 150 may be installed on the first substrate 110 for receiving the sound wave, since the distance spaced between the first substrate 110 and the second substrate 120 is not large. In some cases, the microphone 150 can be installed on the proper position of the second substrate 120.

The acoustic user interface apparatus 100 may include a processor 160 which receives the sound wave, converts the sound wave to a digital signal and generates the position data corresponding to the position of the touched bump(s) if the microphone 150 receives the sound wave when touching and generates an electric signal. The processor 160 can provide the corresponding position data as an input of a character, etc. or a command for the rubbing direction, etc. by interworking with a smart phone, computer and the like.

Figure 7A:
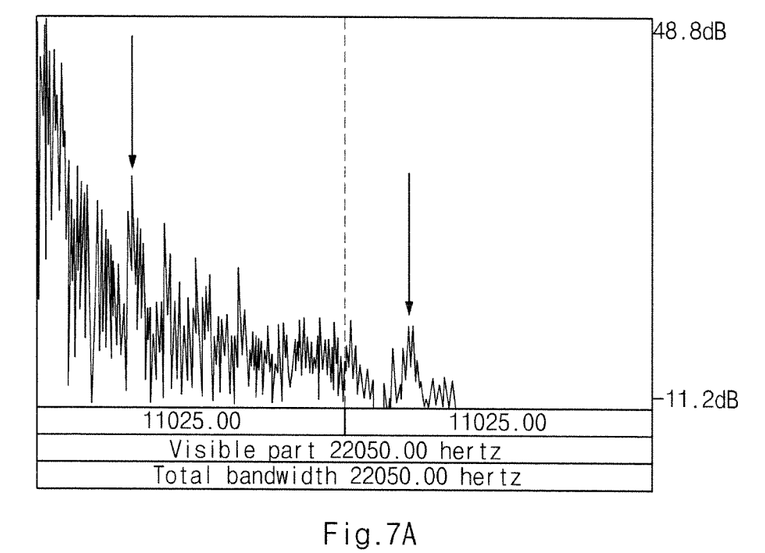
FIGS. 7A and 7B are diagrams illustrating examples of the sound wave analysis according to an embodiment of the present inventive concept.
Figure 7B:
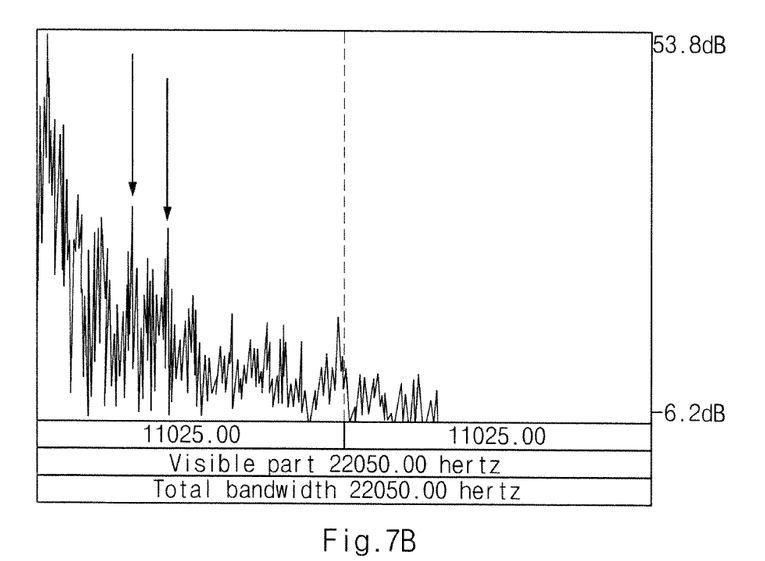

For example, as the above described, by differently forming the area, material, density of the impact surface, or the size or shape of the empty space inside the bump depending on the position, the different sound waves may be generated when colliding, the sound wave of which a characteristic frequency is different depending on the generated position when colliding is generated, and the processor 160 receiving the corresponding electric signal from the microphone 150 can generate the position data for each position by analyzing the frequency bandwidth of the corresponding sound wave and detecting the frequency feature point for the signal size on the spectrum as shown in FIGS. 7A and 7B.

As the above described, the acoustic user interface apparatus 100 can applied to the acoustic based robust touch system In the conventional acoustic user interface (AUI), although the acoustic based touch recognition is performed by utilizing only the collision sound according to the touch of the pad and the finger when touching, because the difference of the signal depending on the position of press and the direction of rubbing is small, the recognition rate is low, and thus the algorithm is necessarily complicated. In the upper and lower plate pad structure by hardware to generate different sound wave as in the present disclosure, because the sound wave by the collision of the second substrate and the first substrate of the pad, not a finger and pad, is utilized, the consideration for the deviation depending on the characteristic of the user's finger or the touch intensity, etc. is not needed, and because the feature point different according to the position of the touch can be derived, the recognition algorithm can be easily and simply implemented.

Also, the acoustic user interface apparatus 100 according to the present disclosure enables easy touch recognition with one microphone, by generating the sound waves different depending upon the position by the bump structure of which the physical quantity is different. Thus, as compared with using a number of buttons, the direction of rubbing, etc. can be easily recognized by simplifying the wiring and the mount. Also, in the conventional method, generally, the degree of precision of the acoustic based touch position recognition through a microphone is low, whereas in the acoustic user interface apparatus 100 according to the present inventive concept, because the discriminative sound wave according to the position by hardware, the touch recognition rate can be improved, by compactly and densely forming the touch cell and the bump, and the resolution of the touch position recognition can be remarkably improved.

In addition, in the acoustic user interface apparatus 100 according to the present inventive concept, since discriminate sound wave can be generated, the rubbing direction can be easily recognized when rubbing through the continued collision of the structure when rubbing, not pressing. Through this, more plentiful user interface configuration is possible. Also, in the acoustic user interface apparatus 100 according to the present inventive concept, by changing the physical shape when touching such as a general keyboard button, a better sense of touch and intuitive feedback is possible. Thus, a user can solve prior problems relating to data input and the accuracy of data input can be improved.

And, in the acoustic user interface apparatus 100 according to the present inventive concept, through the intensity of the collision sound wave generated when touching, a user can easily recognize the intensity of touch. Also, in the conventional acoustic based interface technology, since the different sound is generated according to the humidity of the user's finger, the compensation for it is needed, but, in the present inventive concept, the compensation of the finger condition for an individual user is not needed, also even though a user performs a touch while wearing a glove or using a tool such as a pencil, the sound wave when touching can be recognized without any compensation for the input means.

In the above description, the present inventive concept has been described through specific elements, embodiments, and drawings, it is only provided to assist in a comprehensive understanding of the present inventive concept, the present inventive concept is not limited to the embodiments, and it will be understood by those skilled in the art that the present inventive concept may be implemented as various modifications and variations without departing from the spirit of the present inventive concept. Accordingly, the scope of the present inventive concept is recited in the appended claims, not the above descriptions, and all differences within the equivalent scope of the present inventive concept will be construed as being included in the present invention.

What is claimed is:

1. An acoustic user interface apparatus comprising:
 a first substrate;
 a second substrate including touch cells which are pressable by a touch and restorable by an elastic force, and are arranged in two dimensions; and
 a plurality of bumps, each bump disposed on a respective one of the touch cells to be spaced apart from the first substrate by a predetermined distance, or each bump disposed on a respective position of the first substrate to be spaced apart from a corresponding one of the touch cells by a predetermined distance,
 wherein each bump has a density of impact surface or a size or shape of an empty space inside the bump that is different from other bumps of the plurality of bumps.

2. The acoustic user interface apparatus according to claim 1, wherein one of a top plate and a bottom plate is the first substrate, and the other one of the top plate and the bottom plate is the second substrate.

3. The acoustic user interface apparatus according to claim 1, further comprising a sound wave detector configured to generate an electric signal from a sound wave generated from a bump being collided in response to the touch.

4. The acoustic user interface apparatus according to claim 3, further comprising a processor configured to convert a signal of the sound wave detector to a digital signal and generate position data corresponding to a position of the touched bump.

5. The acoustic user interface apparatus according to claim 1, wherein the second substrate includes a structure type including an upper surface made of a flexible material and the touch cells attached to a lower side of the upper surface.

6. The acoustic user interface apparatus according to claim 1, wherein the second substrate includes a structure type connected by an elastic connector through a side of the touch cells.

7. The acoustic user interface apparatus according to claim 1, wherein each bump is disposed on the respective position of the first substrate to be spaced apart from the corresponding one of the touch cells by the predetermined distance, elastic bodies are provided for each bump, and covers for covering each elastic body are included in the lower surface of the second substrate.

8. An acoustic user interface method for generating a position signal by distinguishing a sound wave of a touch portion according to a position, the method comprising:
 generating a sound wave from a portion collided with a first substrate when touching a second substrate including touch cells which are pressable by a touch and restorable by an elastic force, and are arranged in two dimensions;
 wherein each of a plurality of bumps is disposed on a corresponding position of the first substrate to be spaced apart from a corresponding one of the touch cells by a predetermined distance, and a bump of the plurality of bumps is collided with a touch cell to generate the sound wave,
 wherein each bump has an area, a material, a density of impact surface, or a size or shape of an empty space inside the bump that is different from other bumps of the plurality of bumps, and
 wherein elastic bodies providing the elastic force are disposed between an upper part of each bump and a lower part of the second substrate.

9. The acoustic user interface method according to claim 8, wherein one of a top plate and a bottom plate is the first substrate, and the other one of the top plate and the bottom plate is the second substrate.

10. The acoustic user interface method according to claim 8, further comprising a step of generating an electric signal from a sound wave generated from a bump being collided in response to a touch by using a sound wave detector.

11. The acoustic user interface method according to claim 10, further comprising a step of converting a signal of the sound wave detector to a digital signal and generating position data corresponding to a position of the touched bump by using a processor.

12. The acoustic user interface method according to claim 8, wherein the second substrate includes a structure type including an upper surface made of a flexible material and the touch cells attached to a lower side of the upper surface.

13. The acoustic user interface method according to claim 8, wherein the second substrate includes a structure type connected by an elastic connector through a side of the touch cells.

14. The acoustic user interface method according to claim 8, wherein covers for covering each elastic body are included in the lower surface of the second substrate.

* * * * *